(12) United States Patent
Palethorpe

(10) Patent No.: US 9,719,484 B2
(45) Date of Patent: Aug. 1, 2017

(54) WATER CURRENT POWER GENERATION INSTALLATIONS

(71) Applicant: TIDAL GENERATION LIMITED, Stafford (GB)

(72) Inventor: Benjamin Palethorpe, Bristol (GB)

(73) Assignee: Tidal Generation Limited, Stafford (GB)

( * ) Notice: Subject to any disclaimer, the term of this patent is extended or adjusted under 35 U.S.C. 154(b) by 221 days.

(21) Appl. No.: 14/363,521

(22) PCT Filed: Dec. 19, 2012

(86) PCT No.: PCT/EP2012/076114
§ 371 (c)(1),
(2) Date: Jun. 6, 2014

(87) PCT Pub. No.: WO2013/092687
PCT Pub. Date: Jun. 27, 2013

(65) Prior Publication Data
US 2015/0076828 A1    Mar. 19, 2015

(30) Foreign Application Priority Data

Dec. 23, 2011   (GB) .................................. 1122253.6

(51) Int. Cl.
*F03B 13/10*     (2006.01)
*F03B 13/26*     (2006.01)
*F03B 17/06*     (2006.01)

(52) U.S. Cl.
CPC ............ *F03B 13/10* (2013.01); *F03B 13/264* (2013.01); *F03B 17/061* (2013.01); *F05B 2240/97* (2013.01); *Y02E 10/28* (2013.01)

(58) Field of Classification Search
CPC ............................. F03B 13/10; F05B 2240/97
See application file for complete search history.

(56) References Cited

U.S. PATENT DOCUMENTS

| 3,621,911 A * | 11/1971 | Baker .................... B63C 11/42 166/336 |
| 8,430,639 B2 | 4/2013 | Numajiri et al. |
| 8,872,374 B2 | 10/2014 | Holstein et al. |
| 2004/0189010 A1 | 9/2004 | Tharp |

(Continued)

FOREIGN PATENT DOCUMENTS

| DE | 10 2008 059 891 A1 | 6/2010 |
| GB | 2 431 207 A | 4/2007 |

(Continued)

OTHER PUBLICATIONS

Search Report issued in British Application No. 1122253.6 dated Mar. 22, 2012.

(Continued)

*Primary Examiner* — Tara M. Pinnock
(74) *Attorney, Agent, or Firm* — Dority & Manning, P.A.

(57) ABSTRACT

An infrastructure arrangement for use in an underwater power generation installation includes a support structure adapted for engagement with a bed of a body of water, and an infrastructure module adapted to house infrastructure equipment for connection to power generating units of the installation. The infrastructure module is releasably engageable with the support structure.

14 Claims, 15 Drawing Sheets

(56) References Cited

U.S. PATENT DOCUMENTS

| | | | |
|---|---|---|---|
| 2007/0231072 A1* | 10/2007 | Jennings | F03B 13/10 405/75 |
| 2009/0045631 A1 | 2/2009 | Gibberd et al. | |
| 2010/0119380 A1* | 5/2010 | Wilson | E21B 41/0007 417/53 |
| 2010/0129221 A1 | 5/2010 | Huxley-Reynard et al. | |
| 2011/0074159 A1* | 3/2011 | Stromotich | F03B 13/181 290/53 |
| 2011/0316282 A1 | 12/2011 | Holstein et al. | |
| 2012/0200084 A1* | 8/2012 | Blaxland | F03B 13/10 290/43 |

FOREIGN PATENT DOCUMENTS

| | | | |
|---|---|---|---|
| GB | 2 431 628 A | 5/2007 | |
| GB | 2 437 533 A | 10/2007 | |
| GB | 2 448 710 A | 10/2008 | |
| GB | 2467200 A | 7/2010 | |
| GB | 2470447 A | 11/2010 | |
| SG | WO 2011050403 A1 * | 5/2011 | F03B 13/10 |
| WO | WO 2009/016409 A2 | 2/2009 | |
| WO | WO 2010/116520 A1 | 10/2010 | |
| WO | WO 2011/050403 A1 | 5/2011 | |

OTHER PUBLICATIONS

International Search Report issued in International Patent Application No. PCT/EP2012/076114 dated Apr. 5, 2013.

International Preliminary Report on Patentability issued in International Patent Application No. PCT/EP2012/076114 dated Jun. 24, 2014.

Office Action—Japanese Patent Office, Aug. 2, 2016.

Office Action—Japanese Patent Office, Mar. 24, 2017.

* cited by examiner

WATER CURRENT POWER GENERATION INSTALLATIONS

The present invention relates to water current power generation installations.

BACKGROUND OF THE INVENTION

It is widely known that easily accessible resources of fossil fuels are declining. In addition, the impact of the use of fossil fuels upon the environment has become increasingly apparent. As a result of this, it has become imperative that viable alternative energy sources are used as effectively and efficiently as possible. The use of turbines to capture the power of water flow, such as tidal, river and ocean current flows is becoming a viable source of alternative energy. The turbine equipment used to capture such water flow energy typically includes a shaft driven generator connected using a drivetrain to a rotor assembly. The rotor assembly includes a plurality of rotor blades that are driven by the water flow, so as to turn an input shaft of the drivetrain.

In order to be economically practical, multiple water current turbine devices should be deployed in a suitable area. For example, a tidal turbine farm may have tens to hundreds of turbines. The turbines are preferably arranged in an array having multiple rows of multiple turbines. The turbine array could be deployed in a tidal flow area, a river flow, an ocean current, or any other suitable water current area. Although it is preferable for the turbines to be arranged in an array, geography, bathymetry and other factors may mean that a turbine farm has another arrangement.

In order that such an array of power generating turbines are able to export the generated power from the array, and to receive control signals, it is necessary to provide an amount of infrastructure equipment for the array. In a simple arrangement, each power generating turbine can be connected directly to infrastructure located on the shore. However, such a solution results in many cables being laid, often over large distances. Offshore wind farms make use of switching, transformer and control equipment located in dry spaces above the surface of the water. For such offshore wind farms, providing the infrastructure equipment above the surface does not present any additional problems or issues, since the wind turbines themselves are, naturally, above the water.

However, water current turbines are located underwater, and are often located in water too deep to make surface breaking structures practical. In addition, since the remainder of the array would be under the water surface, it is unlikely that permission would be given for the provision of a surface breaking infrastructure unit.

Installation, maintenance and servicing of such underwater infrastructure equipment, particularly in deep sea environments, are highly costly and time consuming procedures. Infrastructure equipment typically requires through-life inspection, maintenance and servicing. It is therefore desirable to simplify the construction and deployment of underwater infrastructure equipment, lowering capital cost and enabling inspection, servicing and maintenance of the infrastructure equipment in a relatively cost effective and efficient manner.

SUMMARY OF THE INVENTION

According to one aspect of the present invention, there is provided an underwater power generating installation comprising a power generation system, and an infrastructure arrangement which houses infrastructure equipment for the installation, the infrastructure equipment being connected with the power generating system, wherein the infrastructure arrangement comprises a support structure adapted for engagement with a bed of a body of water, and an infrastructure module adapted to house such infrastructure equipment, and adapted to be releasably engageable with the support structure.

In one example of such an installation, the power generation unit comprises a support structure adapted for engagement with the bed of the body of water, and a power generation unit operable to generate power from a water current and adapted to be releasably engageable with the support structure, and the infrastructure module and the power generation unit include substantially identical engagement systems.

In one example of such an installation, the power generation unit and infrastructure module have respective power and control connection arrangements that differ from one another.

According to another aspect of the present invention, there is provided an infrastructure arrangement for use in an underwater power generation installation, the infrastructure arrangement including a support structure adapted for engagement with a bed of a body of water, and an infrastructure module adapted to house infrastructure equipment for connection to power generating units of the installation, and to be releasably engageable with the support structure.

The infrastructure equipment may include one or more unit selected from: monitoring equipment, electrical switching equipment, electrical transformer equipment, control equipment, and hydraulic equipment.

According to another aspect of the present invention, there is provided an underwater structure comprising an infrastructure module including a main body, a mounting portion which extends from the main body and which defines a mounting axis, a connection carrier, and a connector mounted on the connection carrier, and a support structure adapted for engagement with a bed of a body of water, and including a support housing, a support connection carrier attached to the support housing, and a support connector mounted on the support connection carrier, the support connector being adapted for releasable engagement with the connector of the power generation unit, wherein the mounting portion defines a substantially continuous mounting surface which extends substantially completely around the mounting portion, and wherein the support housing defines a substantially continuous support surface which extends substantially completely around the support housing, the mounting surface and support surface being arranged to abut one another substantially continuously when the infrastructure module is mounted on the support structure, and wherein the mounting portion and the support housing are adapted to cooperate with one another for mounting of the infrastructure module on the support structure in any polar orientation about the mounting axis.

In one example of such a structure, the infrastructure module includes connection actuation means operable to move the connection carrier substantially parallel to the mounting axis, and to rotate the connection carrier about the mounting axis. In one example of such a structure, the connection actuation means is provided by a single actuator.

In one example of such a structure, support structure includes support connection actuation means operable to move the support connection carrier substantially parallel to the mounting axis, and to rotate the support connection carrier about the mounting axis.

In one example of such a structure, the support connection actuation means is provided by a single actuator.

In one example of such a structure, the support connection carrier is removable from the support housing.

In one example of such a structure, wherein the support connection carrier includes engagement means operable to engage releasably with the support housing so as to enable releasable engagement of the support connection carrier with the support housing. In one example of such a structure, the support connection carrier is provided a substantially planar plate.

In one example of such a structure, the connection carrier is provided with a predetermined amount of positional float with respect to the mounting portion.

In one example of such a structure, the connection carrier is provided with a predetermined amount of positional float with respect to the actuation means.

In one example of such a structure, the connection carrier includes a locating portion which is acted upon by the actuation means, and a secondary carrier which carries the connector, the secondary carrier being provided with a predetermined amount of positional float with respect to the locating portion.

In one example of such a structure, the connector is provided with a predetermined amount of positional float with respect to the secondary carrier.

In one example of such a structure, the connector is provided with a predetermined amount of positional float with respect to the connection carrier.

DETAILED DESCRIPTION OF THE PREFERRED EMBODIMENTS

Figure 1:
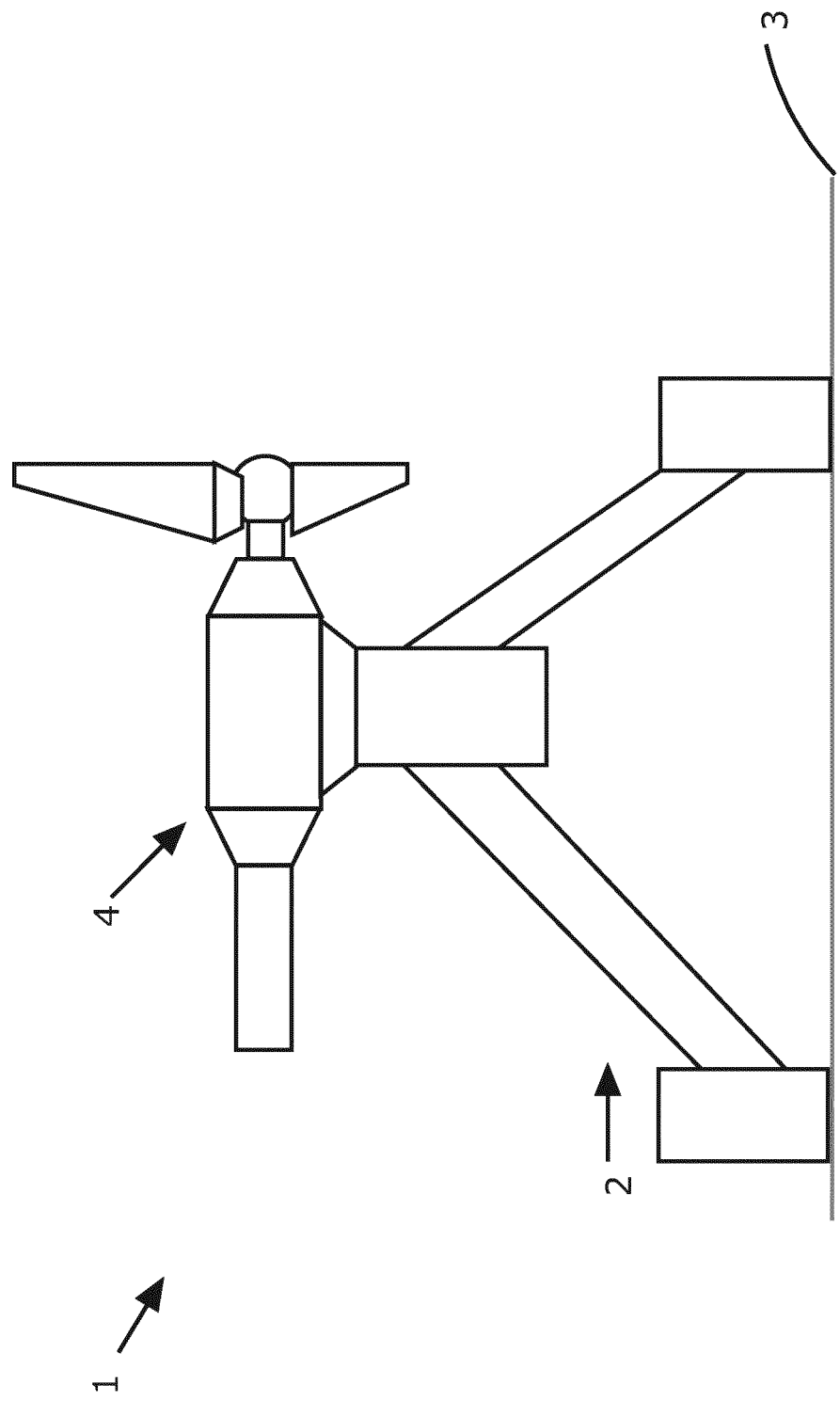
FIG. 1 is a schematic view of an example water current power generation system.

A water current power generation system 1 is shown in FIG. 1 and comprises a support structure 2 located on a bed 3 of a body of water. A power generation unit 4, such as a turbine device, is mounted on the support structure 2. In this example, as the water current flows past the power generation unit 4, a rotor assembly turns, thereby driving an electrical generator, or other power converter apparatus, provided in the power generation unit 4. In one example, the power generation unit 4 is buoyant, and is winched down to the support structure 2.

Figure 2:
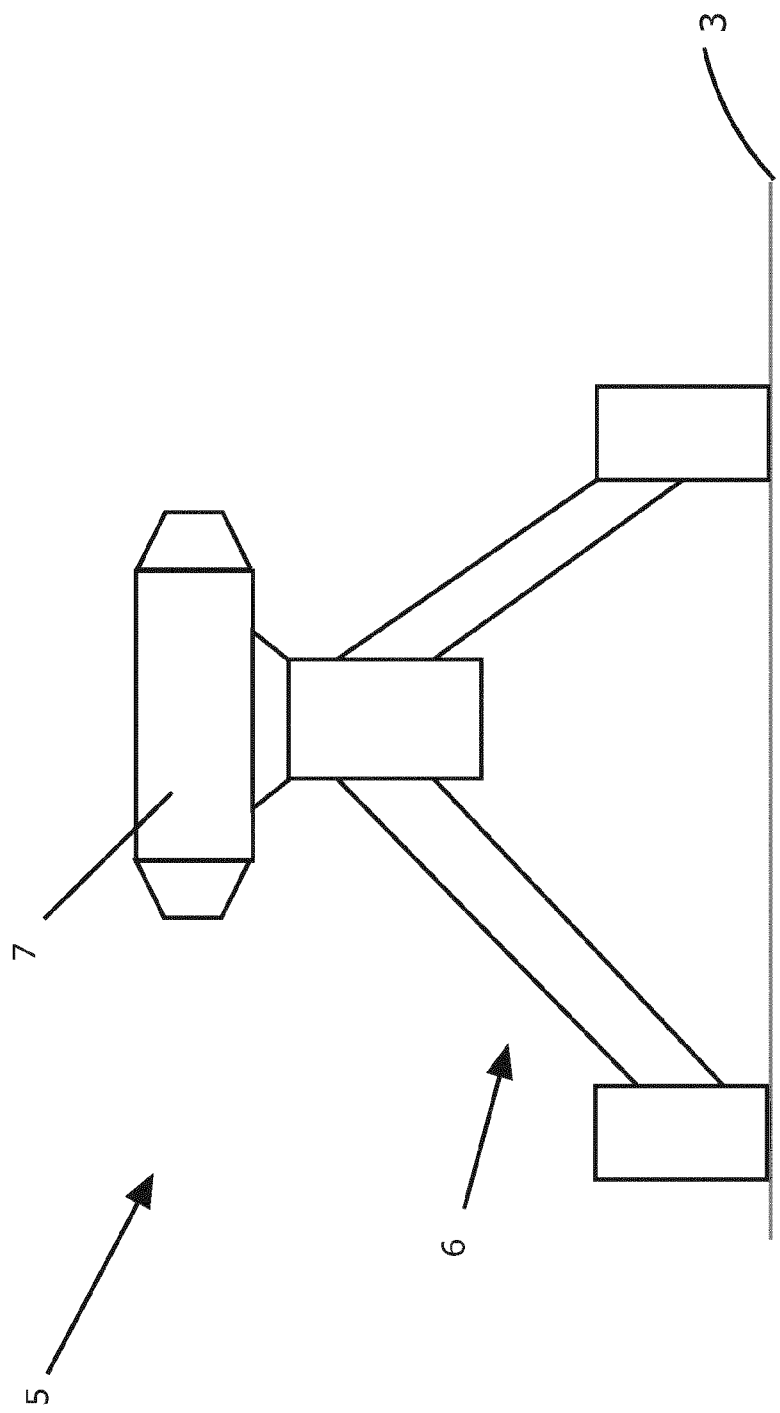
FIG. 2 is a schematic drawing of an infrastructure arrangement for use with the power generation system of FIG. 1.

FIG. 2 illustrates an infrastructure arrangement 5 suitable for use with the power generation system 1 of FIG. 1. The infrastructure arrangement 5 comprises a support structure 6, and an infrastructure module 7 adapted for releasable mounting on the support structure 6. The infrastructure module 7 houses any appropriate equipment such as switches, transformers, measurement and control equipment. In one example, the infrastructure module 7 is buoyant, and is winched down to the support structure 2.

The support structure 6 shown in FIG. 2 is substantially identical to that shown in FIG. 1 for supporting the power generation unit. One example array that makes use of the principles of an aspect of the present invention uses the same basic support structures for power generating units and infrastructure equipment modules. In this way, the same deployment technique can be utilised for power generating units and infrastructure equipment modules. This simplifies the deployment and retrieval of the infrastructure module.

It will readily appreciated that the actual form of the support structure need not be identical to that of the power generating unit, but simply that the structure should enable the use of the same deployment and retrieval techniques as that shown. For example, since the loading on the infrastructure module is not as high as that on a turbine unit, the support structure may not need to be attached to the bed 3 by piles, but may be held in place by gravity. The infrastructure module support structure may also be lower in height than that used for the turbine, since there is not the same requirement for clearance of the blades of the rotor.

Figure 3:
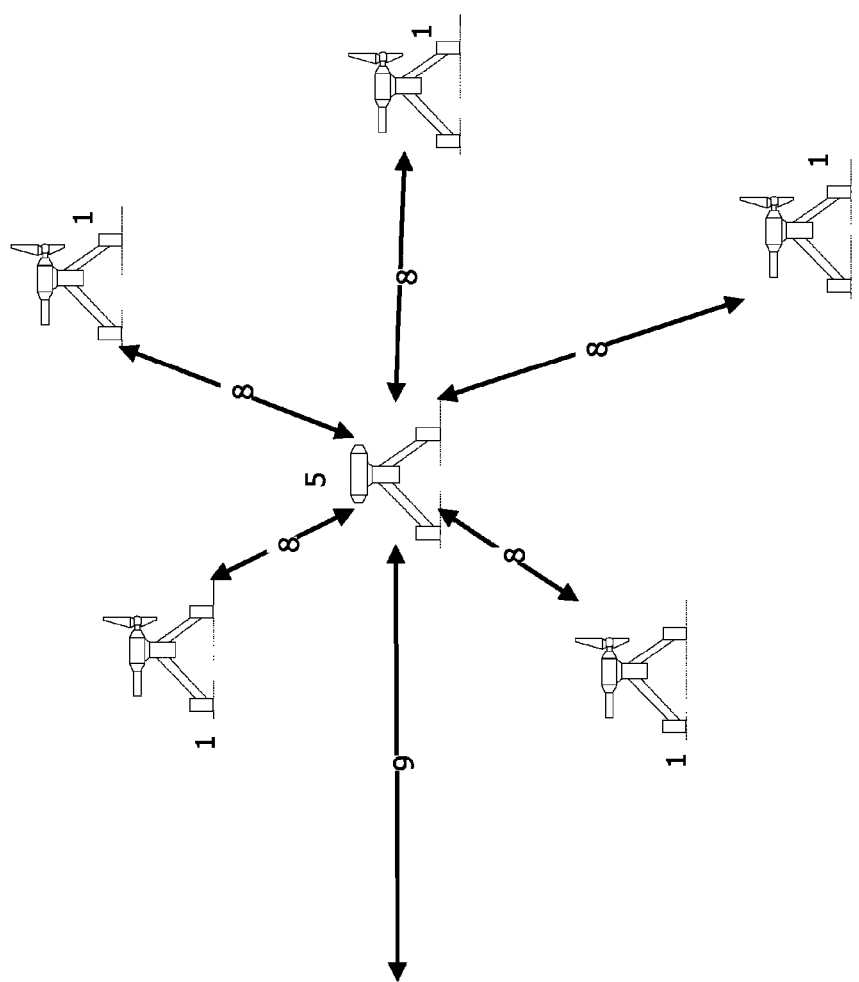
FIG. 3 illustrates an underwater water current power generation array.

FIG. 3 illustrates an array of turbines 1 connected to a common infrastructure arrangement 5, via illustrative connections 8. The infrastructure arrangement provides common power, measurement and control equipment for all of the turbines 1, and it will be appreciated that any number of turbines may be provided in the array. Similarly, it will be appreciated that any number of infrastructure arrangements 5 may be provided, and that such arrangements may be interconnected as appropriate.

The infrastructure arrangement 5 is provided with an external connection 9, for example, to an electricity grid (directly or indirectly) and/or to a control/monitoring centre. In the case where the infrastructure arrangement is connected to an electricity grid, the infrastructure module may include transformer and other electrical equipment for adjusting the output voltage of the external connection, so that the output electricity is appropriate to the power requirements and length of connection.

Figure 4:
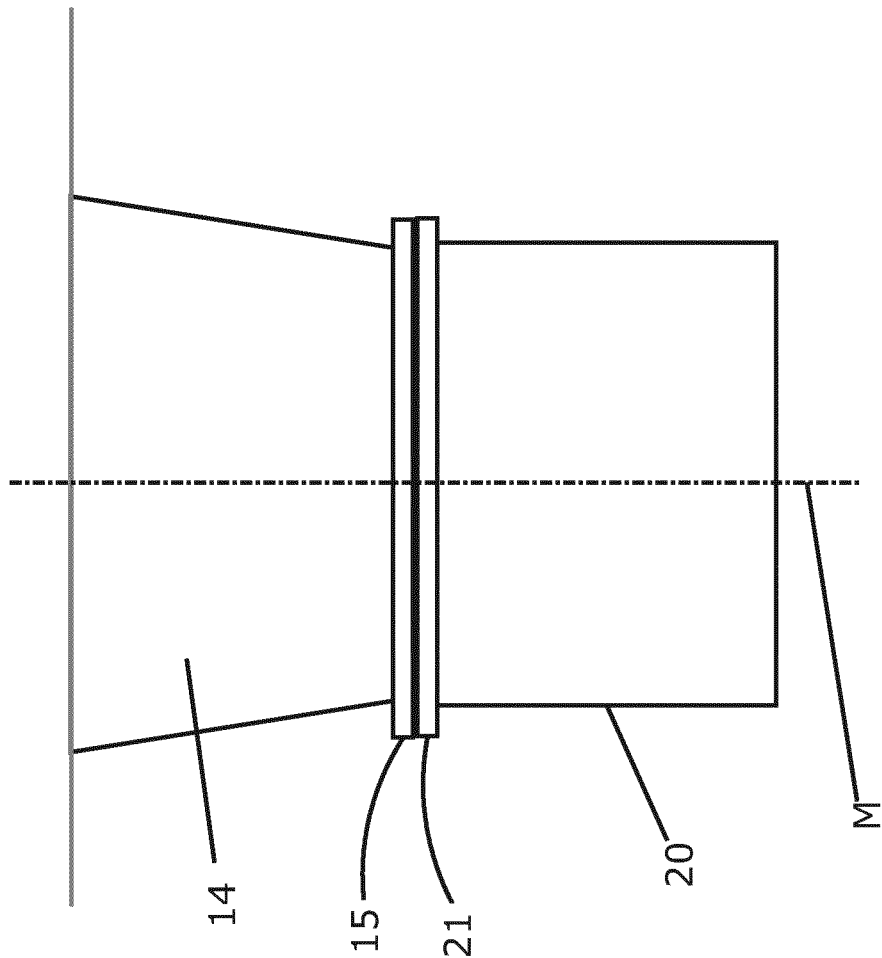
FIG. 4 illustrates a connection between an infrastructure module and a support structure of the arrangement of FIG. 2.

The attachment of the infrastructure module 7 to the support structure 6 is shown in more detail in FIG. 4. The infrastructure module 7 has a main body and is attached to the support structure by way of a mount 14 that extends from the main body. The mount 14 defines a mounting axis M for the infrastructure module 7.

The mount 14 has a mounting flange 15 which engages with an associated support flange 21 provided by a support housing 20 of the support structure 6. The mounting and support flanges 15 and 21 allow the infrastructure module 7 to be affixed to the support structure 6 in an appropriate manner.

Figure 5:
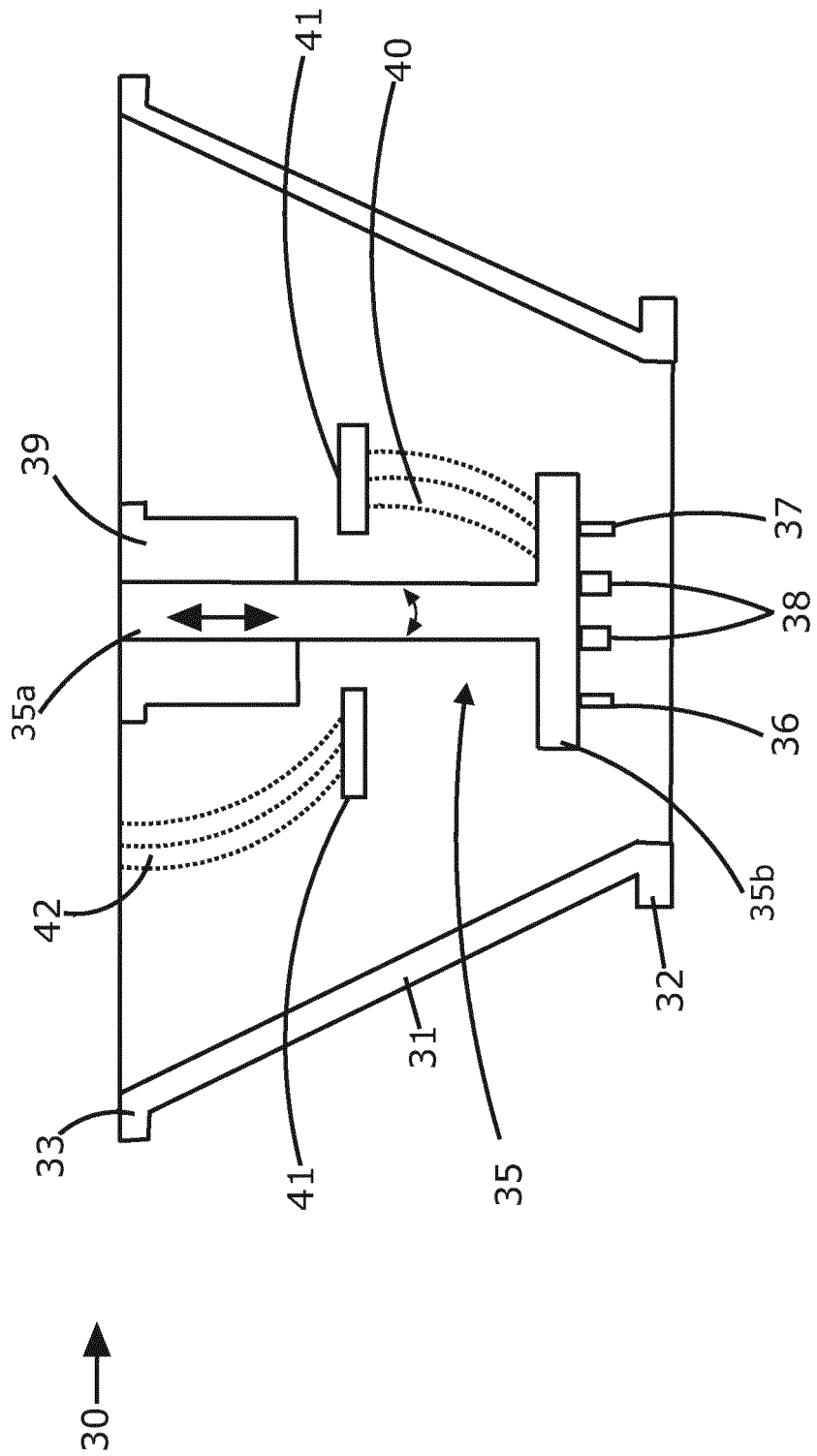
FIG. 5 illustrates a mounting portion of the infrastructure module of FIG. 4.

FIG. 5 is a schematic cross-sectional view of an example mount 30 for an infrastructure module 7. This example mount 30 is provided with a tapered mounting portion 31 which is substantially circular in cross-section, and which provides an aperture therethrough. In the example shown in FIG. 5, the mounting portion 31 is in the form of a truncated cone, but could be provided by any suitable shape. It will be appreciated that the mounting portion 31 need not be tapered nor circular in cross section, but may be provided by any suitable shape. For example, the mounting portion 31 may be provided by a hollow cylinder, or by a hollow prism.

The mounting portion 31 has, at a distal end thereof, a mounting flange 32, which defines a substantially circular and substantially continuous mounting surface. In the example shown in FIG. 5, an attachment flange 33 is provided for attaching the mount 30 to the main body of the infrastructure module 7. The mount 30 can be bolted, welded, or fixed in any other suitable manner, to the infrastructure module 7, and may not require the provision of the attachment flange 33.

A connection carrier 35 is provided within the mounting portion 31, and carries any appropriate number of electrical, optical and other connectors 38. The precise nature and number of connectors 38 carried by the connection carrier 35 is not material to examples of the present invention. In FIG. 5, the connection carrier 35 is shown in a first, unconnected, configuration.

The connection carrier 35 may be provided by any suitable shape and configuration. The exemplary connector carrier shown in FIG. 5 comprises a carrier shaft (or locating portion) 35a onto which is mounted a carrier plate 35b. The connectors 38 are carried by the carrier plate 35b, on a mating surface of the carrier plate 35b.

The connection carrier shaft 35 is mounted on actuation means 39, such as one or more hydraulic or electrical actuators. The actuation means 39 serve to move the connection carrier 35 in a direction substantially parallel to the mounting axis M. The actuation means 39 also operate to rotate the connection carrier 35 about that axis M. The actuation means may be provided by any suitable arrangement of equipment. In one example, the actuation means comprises a linear actuator linked to the carrier shaft 35a by a linkage arrangement, and a rotary actuator that operates directly on the carrier shaft 35a. In another example, the actuation means includes an actuator that engages the carrier plate 35b for rotation of the connection carrier 35. The actuation means may be located in any convenient location in the mounting portion 31, and/or in the infrastructure module 7.

The connection carrier 35 is provided with at least one alignment pin, such as the two alignment pins 36 and 37 shown in FIG. 5, which extend from the carrier plate 35b. As will be described in more detail below, the alignment pins serve to enable accurate alignment of the connection carrier 35 on the support structure 6.

Figure 6:
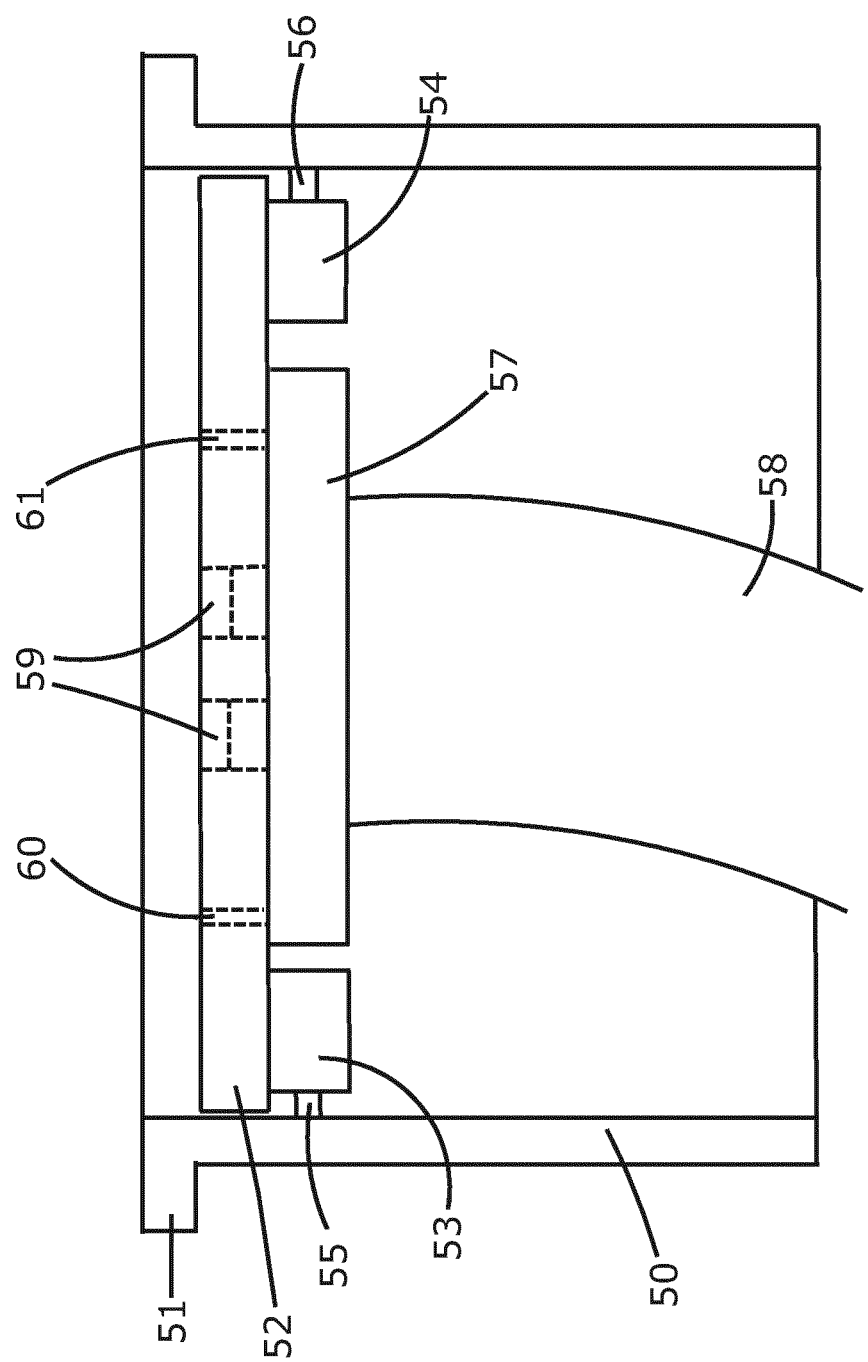
FIG. 6 illustrates a support housing of a support structure of the arrangement of FIG. 2.

Connector cables 40 are connected with the connectors 38, and are routed through a cable management system 41 before connecting to cables 42 from the infrastructure module 7. FIG. 6 illustrates a schematic cross-sectional view of a support housing 50 provided on the support structure 6. The example support housing 50 shown in FIG. 5 is substantially cylindrical, and defines a circular aperture therethrough. It will be readily appreciated that, as for the mounting portion 31 of the infrastructure module 7, the support housing 50 can be of any suitable shape and cross section.

The support housing 50 includes a support flange 51 which defines a substantially circular and substantially continuous support surface onto which the mounting surface of the mount 30 abuts when the infrastructure module 7 is mounted on the support structure 6.

A support connection carrier 52 is provided in the support housing 50. The support connection carrier 52 extends across the aperture of the support housing 50, and carries support connectors 59 for connecting to the connectors 38 of the connection carrier 35 of the infrastructure module 7. Alignment apertures 60 and 61 are arranged to receive the alignment pins 36 and 37 of the infrastructure module 7. It will be appreciated that any number of alignment pins and associated apertures can be provided. In one example, the alignment holes 60 and 61 have conical openings configured to allow for some level of initial misalignment of the alignment pins.

It is to be noted that the alignment pins may be provided on the support connection carrier, and the corresponding alignment apertures on the connection carrier of the mounting portion. It will be readily appreciated that each of the carriers may be provided with both alignment pins and alignment apertures, with corresponding apertures and pins being provided on the other of the carriers.

The support connection carrier 52 also includes a cable connector 57 arranged to connect the support connectors 59 to an input/output cable 58. The cable 58 is used to connect the infrastructure equipment housed in the infrastructure module 7 to the power generating unit(s) in the array. The cable 58 may also include connections to other infrastructure modules. In addition the cable 58 represents an external connection from the array, for example to a control centre and to the electricity grid connection. It will be appreciated that any appropriate number of cables and connections can be provided, and that the cable 58 is shown in FIG. 6 by way of illustration.

In the example shown in FIG. 6, the support connection carrier 52 is removable from the support housing 50, and is held in place using locking actuators 53 and 54, which serve to move engagement features 55 and 56 into engagement with an inner surface of the support housing 50. Such an arrangement enables the support connection carrier 52 to be removed from the support housing 50 for maintenance purposes, without the need to remove the whole support structure, or support housing, or to undertake complex underwater cutting and welding operations.

Figure 7:
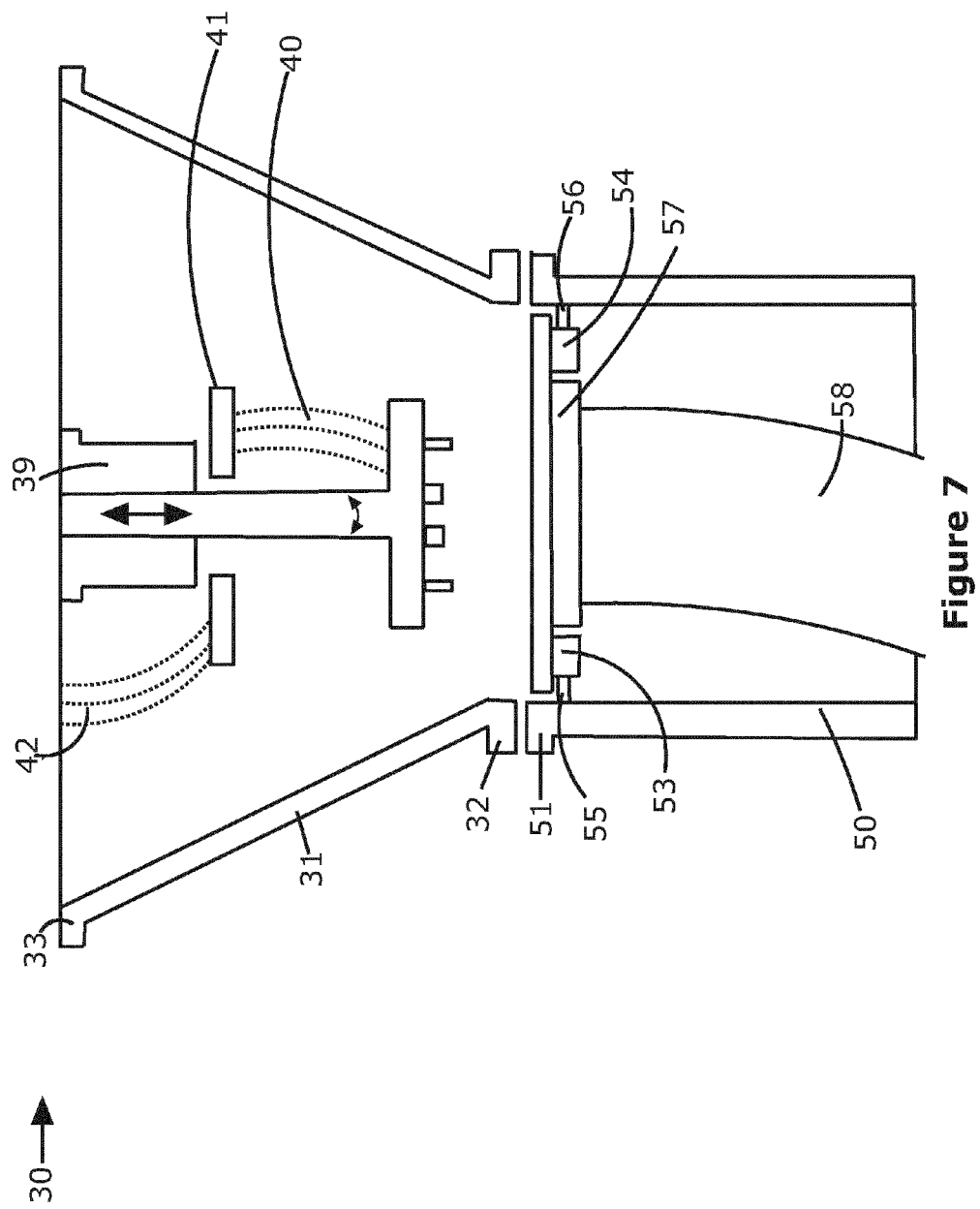
FIG. 7 illustrates the mounting portion of FIG. 5 engaged in a first configuration with the support housing of FIG. 6.

FIG. 7 illustrates the mount 30 of FIG. 5 located on the support housing 50 of FIG. 6 in a first, unconnected, configuration. The mount 30 is brought into contact with the support housing 50, so that the mounting and support surfaces defined by the attachment flanges 32 and 51 respectively abut one another. The connectors 37, 38 of the infrastructure module 7 and the support connectors 59 remain unconnected at this stage.

Figure 8:
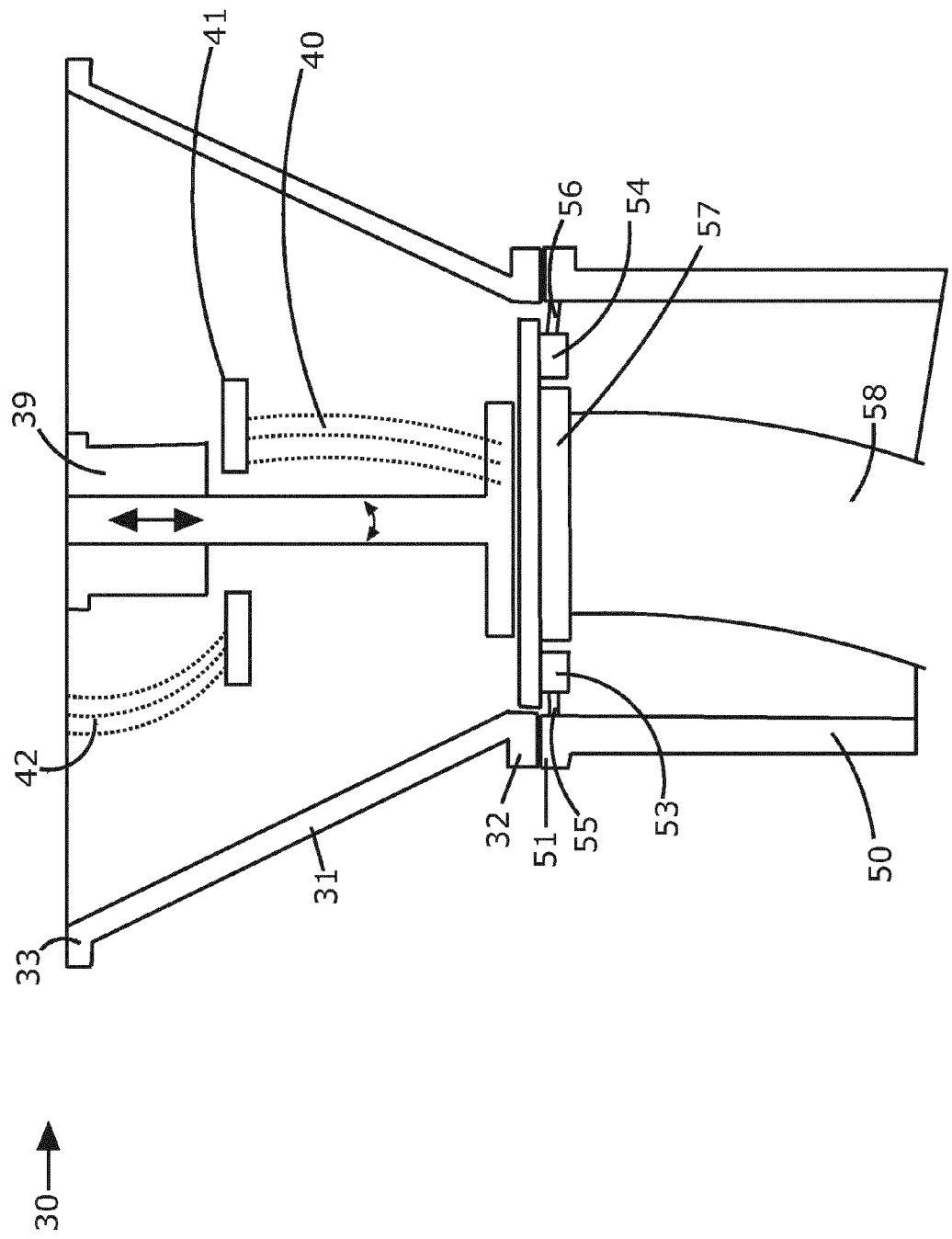
FIG. 8 illustrates the mounting portion of FIG. 5 engaged in a second configuration with the support housing of FIG. 6.

FIG. 8 shows a second configuration in which the connection carrier 35 has been moved axially in a direction substantially parallel to the mounting axis M, such that the connectors 38 and alignment pins 36 and 37 are engaged with associated connectors 59 and alignment apertures 60 and 61 on the support connection carrier 52. The actuator 39 is operated to move the connection carrier 35 into connection with the support connection carrier 52.

Before the connection carrier 35 is moved into position axially, it may need to be rotated in order that the alignment pins 36 and 37 are substantially aligned with the alignment holes 60 and 61 respectively. A motor for providing this rotation may be provided within the mounting portion 31, or the rotation may be achieved by the actuation means 39.

As the connection carrier 35 moves into connection with the support connection carrier 52, the connectors 38 meet with the corresponding connectors 59 to complete the electrical/hydraulic, optical and/or control connections between the infrastructure module 7 and the cable 58.

Figure 9:
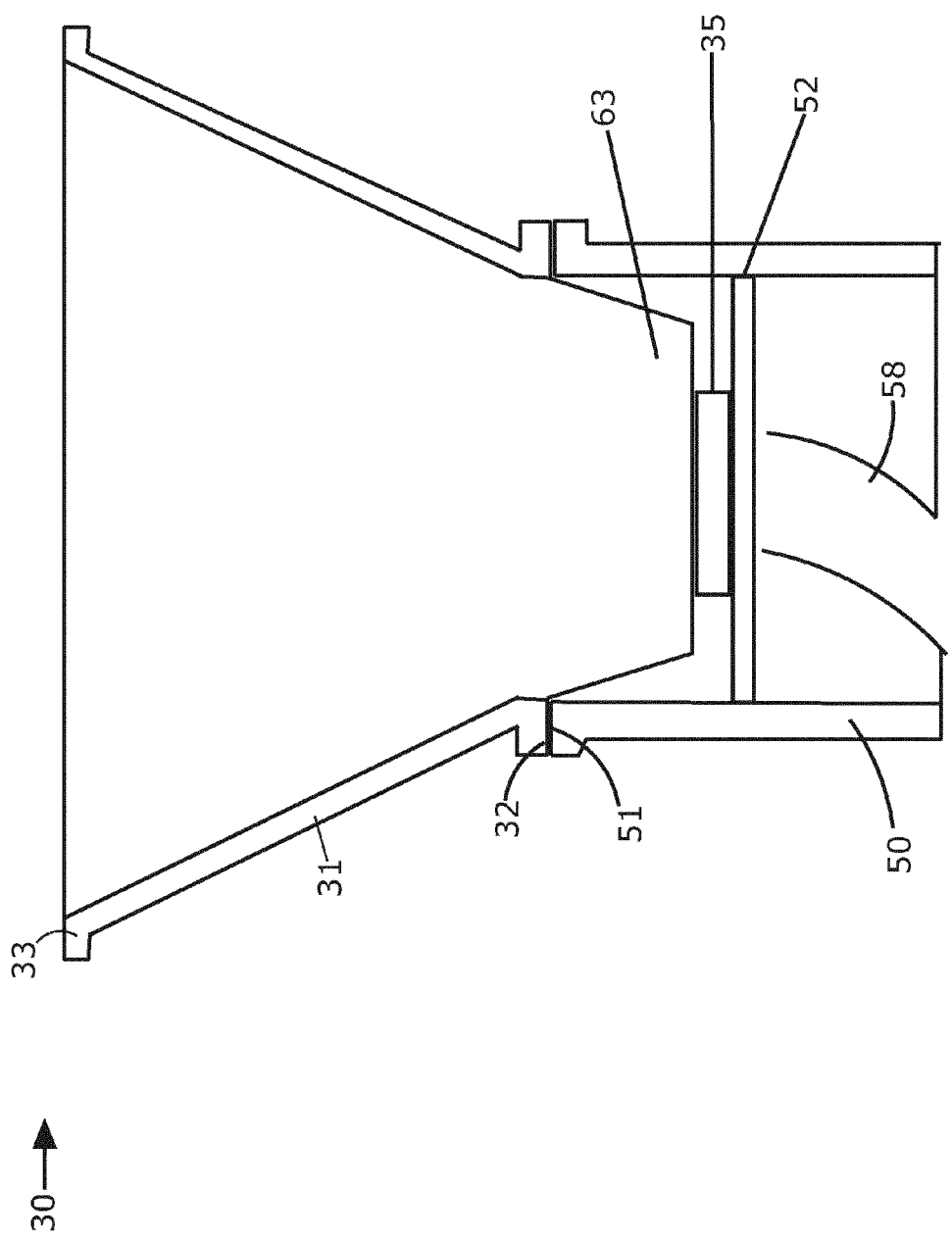
FIG. 9 illustrates an alternative example of mounting portion of the infrastructure module of FIG. 4.

FIG. 9 illustrates another example of a mount 30 located on the support housing 50. In this example, the mounting portion 31 includes a locating portion 63 which extends from an end region of the mounting portion 31. The locating portion 63 extends from within the mounting portion 31 past the mounting flange 32. The locating portion 63 is coaxial with the mounting portion 31, and is provided with an aperture therethrough. The locating portion 63 is tapered so as to aid location of the infrastructure module 7 on the support structure 6. As the infrastructure module 7 is lowered into place on the support structure 6, the distal end of the locating portion 63, which is narrower than the aperture of the support housing 50 of the support structure 6, is able to enter the support housing structure 50 with a degree of positional freedom. That is, the accuracy of location of the distal end of the locating portion 63 is not as fine as that required to locate the mounting and support flanges 32 and 51. As the infrastructure module 7 continues to be lowered onto the support structure 6, the locating portion 63 centres the mount 30 on the support housing 50, such that the mounting and support surfaces abut one another. It will be appreciated that a similar locating portion could be provided by the support housing 50 instead of by the mount 30.

The mounting surface transfers the load of the infrastructure module 7 onto the support surface, and hence into the support structure 6. The substantially circular and substantially continuous nature of the mounting and support surfaces serves to distribute the loads around the support housing, and to remove, or substantially reduce, the occurrence of point loading on the support housing.

The substantially circular and substantially continuous nature of the mounting surface of the infrastructure module 7 and of the support surface of the support housing 6, in combination with the rotatable connection carrier of the infrastructure module 7, also enables the mounting portion 30 to be located on the support housing 50 in any polar orientation with respect to the mounting axis M.

The ability to mount the infrastructure module 7 on the support structure in any polar orientation (that is, without discrete mounting locations) simplifies the deployment of the infrastructure module 7 to the support structure 6. This is because there is no requirement to orient the unit as it descends into its mounting position on the support structure 6.

In addition, this polar mounting freedom of the infrastructure module 7 enables the location and orientation of the support structure 6 to be simplified, since the polar orientation of the support housing is not important when the infrastructure module 7 can be mounted, and then operated, in any polar orientation with respect to the support structure 6.

Due to the loading associated with tidal flow, it is preferable to use a clamping arrangement, such as that shown in UK Patent Number 2448710.

The mounting arrangements described above are particularly advantageous for use with a single cable winch deployment system, such as that described in UK Patent Number 2431628. In such a configuration, a winch cable tube or aperture is provided substantially aligned with the mounting axis. In one example, a tube is provided through the connection carriers, through an arm of the actuation means, and then through the infrastructure module 7.

In a practical example of an arrangement that follows the principles of those described above, a degree of positional freedom, or "float" is desirable for at least some of the components. In this context, the term "float" is used to mean that a component has some flexibility of movement about a nominal mounting position, without the need for specific adjustment intervention. This positional float is provided in order to allow for manufacturing and positioning tolerance.

Figure 10:
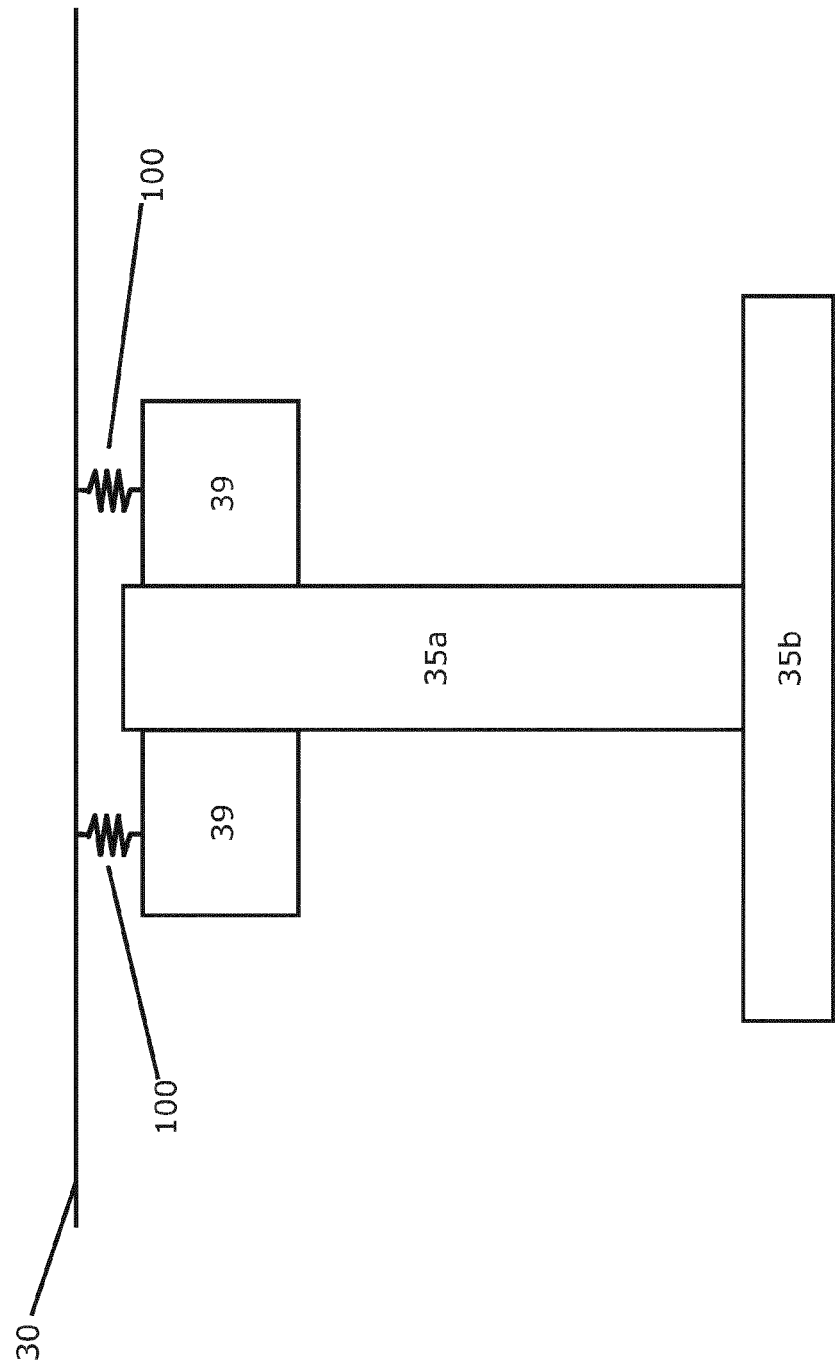
FIGS. 10 to 14 illustrate respective examples of connection carrier mounting.

FIG. 10 illustrates a first example of float, in which the actuation means 39 are able to float in position with respect to the mount 30. In FIG. 10, this floating coupling is illustrated by mounting elements 100, which are illustrative only. The elements 100 can be provided by any suitable means, for example flexible mountings or slot and pin arrangements. Using the arrangement of FIG. 10, the whole of the actuation means and connection carrier assembly is able to float in position with respect to the mount 30. Following initial rotational alignment, as the actuation means 39 moves the connection carrier 35 linearly, the alignment pins (not shown in FIG. 10 for clarity) are brought into engagement with the corresponding alignment apertures. If there is any misalignment of the pins and apertures, the alignment pins cause the actuation means and connection carrier assembly to move with respect to the mount, as those pins are brought into alignment with the apertures. The respective shapes of the alignment pins and alignment apertures serve to bring the pins into alignment with the apertures through the linear action of the connection carrier 35. The float provided to the actuation means and carrier assembly by the mounting elements 100 enable the lateral, rotational and angular position of the carrier plate 35b to be aligned correctly with the corresponding support connection carrier to enable the connectors to engage with one another.

Figure 11:
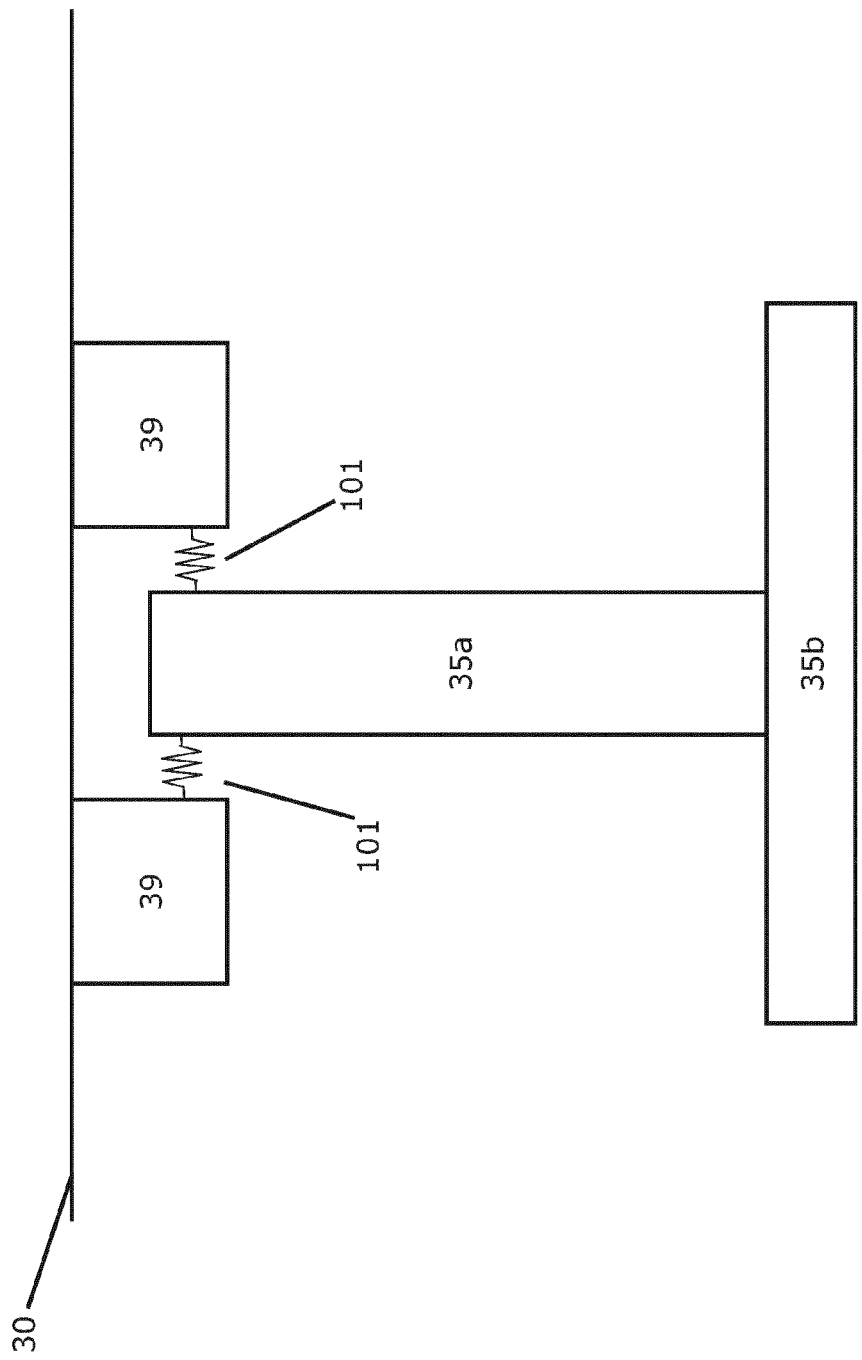

FIG. 11 illustrates another example of the provision of float to the connection carrier 35. In this example, the actuation means 39 are fixed substantially rigidly with respect to the mount 30, and the connection carrier 35 is able to float with respect to the actuation means 39. This float is illustrated by the elements 101. In this example, the float may be provided by specifying bearings between the actuation means 39 and the carrier shaft 35a that have a required amount of play. In this way, the carrier shaft 35a and the carrier plate 35b are able to move with respect to a nominal mounting position by the action of the alignment pins aligning and engaging with the alignment apertures.

Figure 12:
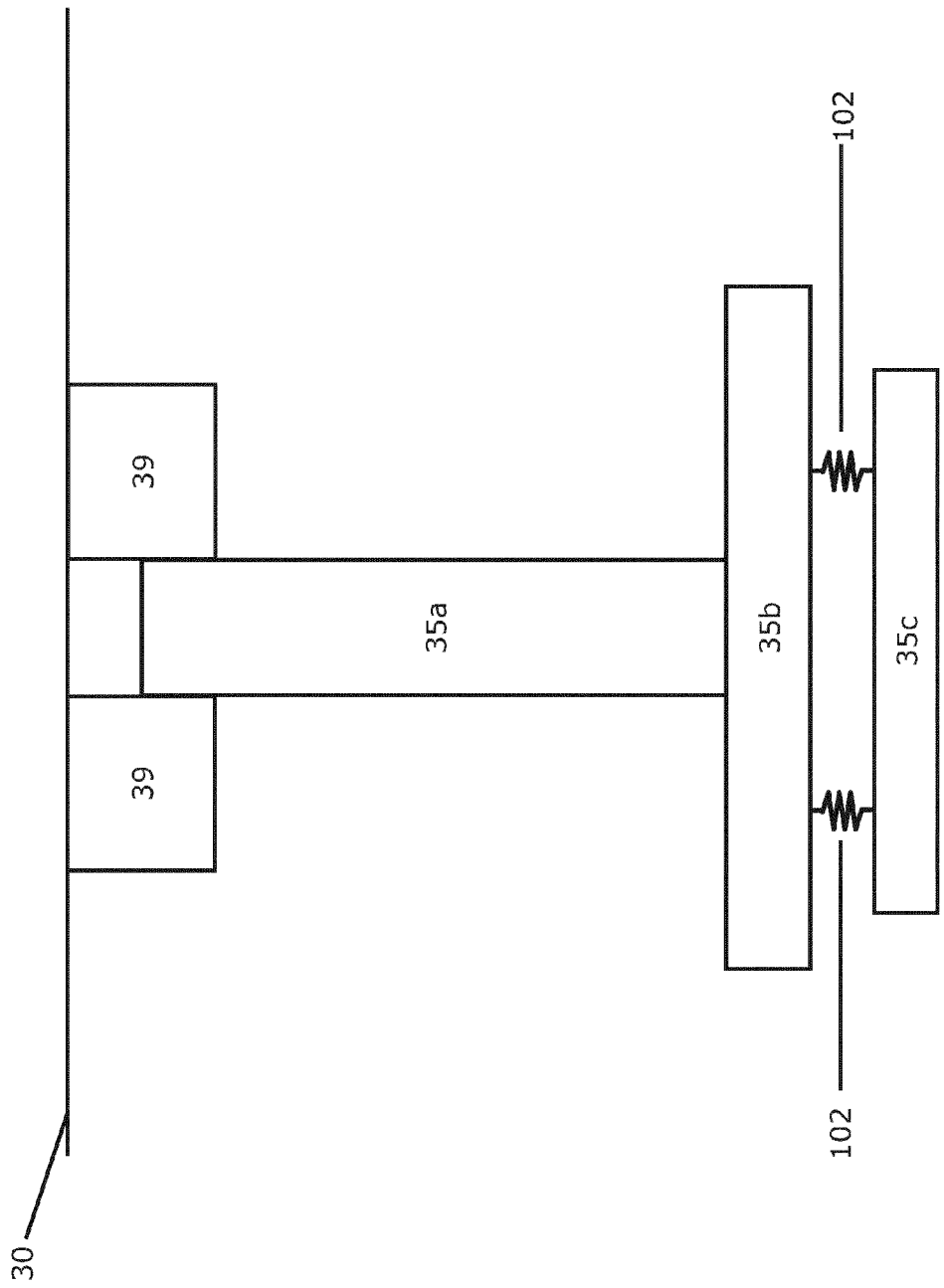

FIG. 12 illustrates another example of the provision of float to the connection carrier. In this example, the actuation means 39 are fixed substantially rigidly with respect to the mount 30, and the carrier shaft 35a is located in the actuation means 39 using bearing having substantially no play. As such, the carrier shaft 35a and carrier plate 35b are moveable linearly, and are rotatable, with respect to the mount 30 substantially without float. A secondary carrier 35c is mounted on the carrier plate 35b on mounting elements 102. The mounting elements 102 are illustrative only and may be provided by any suitable arrangement. The mounting elements 102 allow the secondary carrier 35c to float with respect to the carrier plate 35b. the secondary carrier plate 35c carries the alignment pins and connectors (not show for clarity), and so the float provided to the secondary plate 35c enables the alignment of the alignment pins and connectors carried by the secondary carrier 35c.

Figure 13:
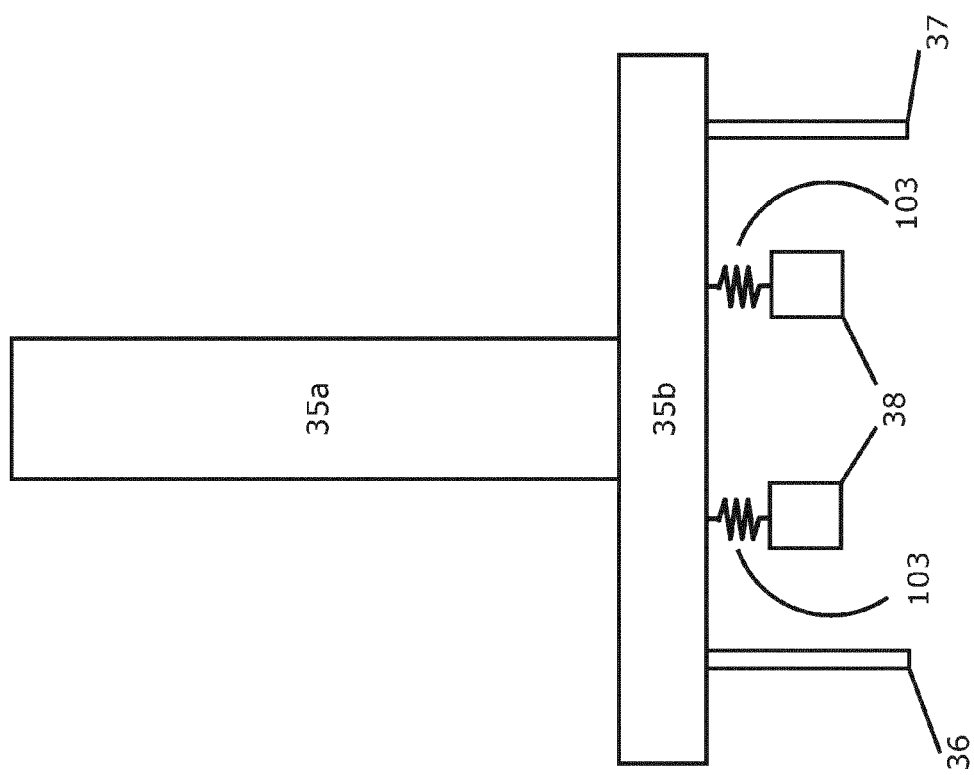

FIG. 13 illustrates the connection carrier 35, comprising the carrier shaft 35a, and the carrier plate 35b, and illustrates another example of the provision of float. Alignment pins 36 and 37 extend from the carrier plate 35b without the provision of float. The connectors 38 are mounted on the carrier plate 35b by way of mounting elements 103 that allow a predetermined amount of float for the connectors 38. As the carrier plate 35b is brought into engagement with the support connection carrier of the support structure, the mounting elements 103 allow the connectors 38 to align correctly with the support connectors of the support structure.

Figure 14:
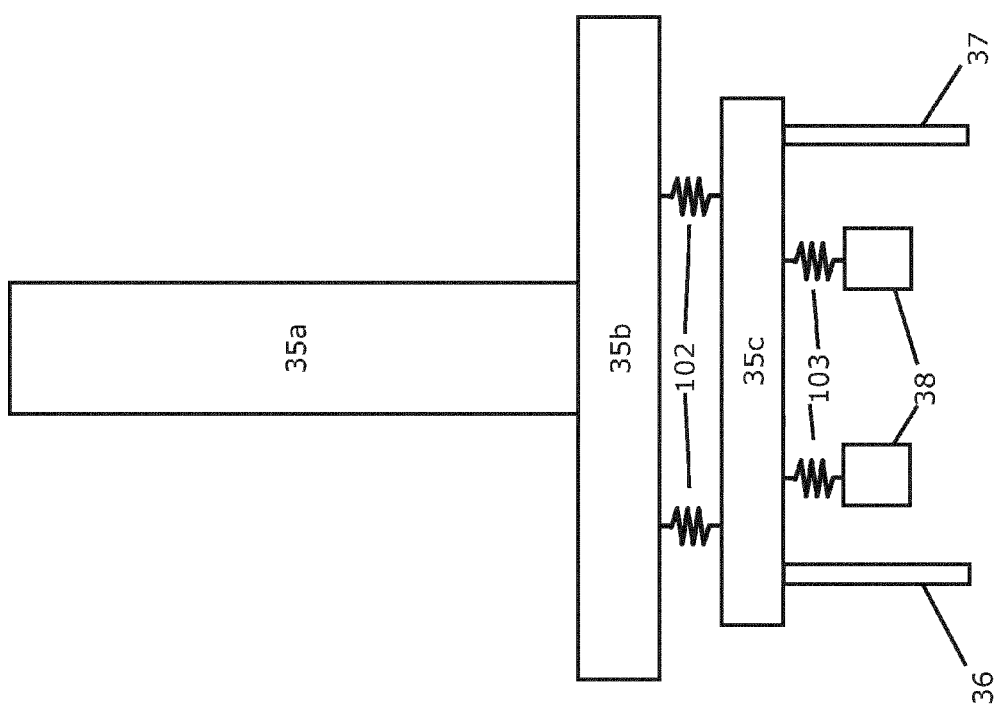

FIG. 14 illustrates the connection carrier 35 making use of the float techniques illustrated in FIGS. 11 and 12. As such, a secondary carrier plate 35c is provided on the carrier plate 35b, and is able to float with respect to the carrier plate 35b. In addition, connectors 38 are mounted on the secondary carrier plate 35c by way of elements that allow float of the connectors with respect to the secondary carrier plate 35c. Alignment pins 36 and 37 extend from the secondary carrier plate 35c substantially without float. In this way, as the connection carrier is brought into engagement with the support connection carrier, the alignment pins engage with the alignment apertures. If there is any slight misalignment, the action of the alignment pins engaging with the apertures causes the secondary carrier plate 35c to move (laterally, rotationally, and/or angularly) such that the alignment pins are able to engage fully with the apertures. As the connectors 38 come into engagement with the support connectors, the mounting elements 103 allow the connectors to align correctly, taking up any minor misalignment.

It will be appreciated that the float provision of FIGS. 10 to 14 may be used individually, or in any suitable combination, depending upon the requirements and specific design of connection carrier. The provision of positional float enables the action of the alignment pins engaging with the alignment apertures to cause alignment of the connectors to allow for manufacturing or fitting tolerances of the connection carriers. Providing the individual connectors with float then enables any connector-related misalignment to be taken up and overcome.

Figure 15:
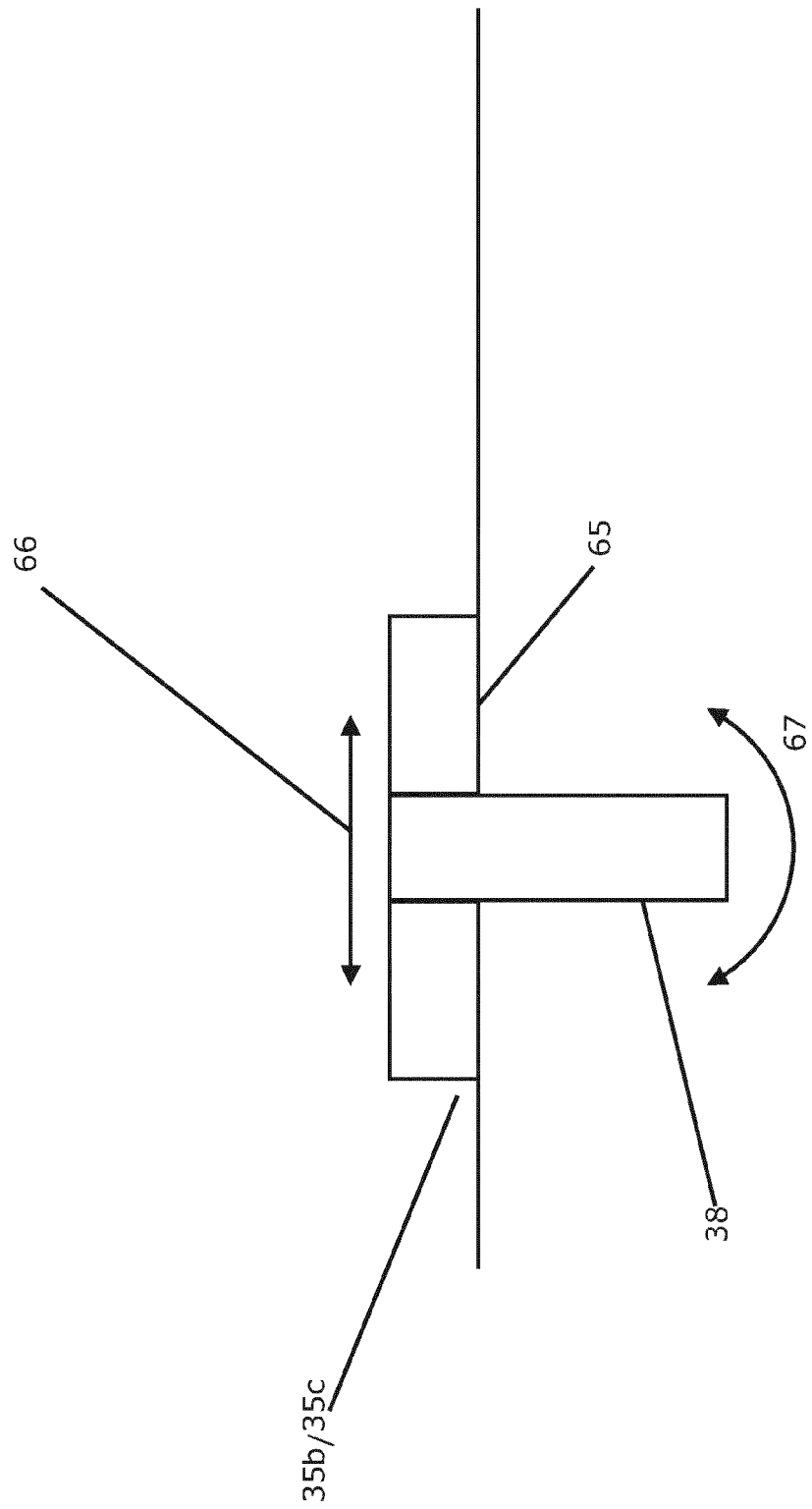
FIG. 15 illustrates mounting of a connector.

FIG. 15 illustrates an example of mounting of a connector 38 on the carrier plate 35b or on the secondary carrier plate 35c. The connector 38 is attached to the carrier plate 35b/35c via a flexible attachment means 65. The attachment means 65 allows a predetermined amount of lateral float 66 of the connector 37, and also allows a predetermined amount of angular float 67 of the connector 37. In such a manner, an amount of lateral and angular mismatch can be taken into account when the connectors are brought into connection with support connectors on the support connection carrier. It will be readily appreciated that the support may be provided with such positional freedom in addition to, or in place of, that provided to the connectors of the infrastructure module.

The invention claimed is:

1. An underwater power generating installation comprising a power generation system on a bed of a body of water, and an infrastructure arrangement which houses infrastructure equipment for the installation, the infrastructure equipment configured to receive electricity generated by the power generation system, the infrastructure arrangement spaced from the power generation system on the bed of a body of water and connected with the power generating system via connections across the bed of a body of water, wherein the infrastructure arrangement comprises a first support structure engaged with the bed of a body of water, an infrastructure module that houses the infrastructure equipment and is releasably engaged with the first support structure, the power generation system comprising a power generation unit operable to generate electricity from a water current and releasably mounted on a second support structure, and the infrastructure module releasably engaged with the first support structure with a mount that enables all polar orientations of the infrastructure module on the first support structure relative to a mounting axis of the infrastructure module.

2. The underwater power generating installation as claimed in claim 1, wherein the power generation unit and infrastructure module have respective power and control connection arrangements that differ from one another.

3. The underwater power generating installation as claimed in claim 1, wherein the infrastructure equipment housed in the infrastructure module includes one or more unit selected from the group consisting of: monitoring equipment, electrical switching equipment, electrical transformer equipment, control equipment, and hydraulic equipment.

4. An infrastructure arrangement for use in an underwater power generation installation, the infrastructure arrangement including a support structure adapted for engagement with a bed of a body of water, and an infrastructure module that houses infrastructure equipment for connection to remote power generating units of the installation that are spaced from the support structure on the bed of a body of water in an operable state of the infrastructure, and to be releasably engageable with the support structure, the infrastructure equipment configured to receive electricity generated from one or more of the remote power generating units in the operable state of the infrastructure arrangement, and the infrastructure module releasably engaged with the support structure with a mount that enables all polar orientations of the infrastructure module on the support structure relative to a mounting axis of the infrastructure module.

5. An underwater structure comprising:
an infrastructure module including a main body, a mounting portion which extends from the main body and which defines a mounting axis, a connection carrier, and a connector mounted on the connection carrier; and
a support structure adapted for engagement with a bed of a body of water, and including a support housing, a support connection carrier attached to the support housing, and a support connector mounted on the support connection carrier, the support connector being adapted for releasable engagement with the connector of the infrastructure module, wherein the mounting portion comprises a mounting flange that defines a substantially continuous mounting surface which extends substantially completely around the mounting portion, and wherein the support housing comprises a support flange that defines a substantially continuous support surface which extends substantially completely around the support housing, the mounting flange and the support flange being arranged to abut one another substantially continuously when the infrastructure module is mounted on the support structure,
wherein the mounting portion and the support housing are adapted to cooperate with one another for mounting of the infrastructure module on the support structure in any polar orientation about the mounting axis; and
infrastructure equipment housed within the infrastructure module for connection to remote power generating units that are spaced from the underwater structure on the bed of a body of water in an operable state of the underwater structure, the infrastructure equipment configured to receive power generated from one or more of the remote power generating units in the operable state of the underwater structure.

6. The structure as claimed in claim 5, wherein the infrastructure module includes an actuator connected with the connection carrier to move the connection carrier substantially parallel to the mounting axis, and to rotate the connection carrier about the mounting axis.

7. The structure as claimed in claim 5, wherein the support connection carrier is removable from the support housing.

8. The structure as claimed in claim 7, wherein the support connection carrier includes engagement devices that actuate to engage releasably with the support housing so as to enable releasable engagement of the support connection carrier with the support housing.

9. The structure as claimed in claim 7, wherein the support connection carrier is provided as a substantially planar plate.

10. The structure as claimed in claim 5, wherein the connection carrier is provided with a predetermined amount of positional float with respect to the mounting portion.

11. The structure as claimed in claim 5, wherein the infrastructure module includes an actuator connected with the connection carrier to move the connection carrier substantially parallel to the mounting axis, and to rotate the connection carrier about the mounting axis, and wherein the connection carrier is provided with a predetermined amount of positional float with respect to the actuation means.

12. The structure as claimed in claim 11, wherein connection carrier includes a locating portion which is acted upon by the actuator, and a secondary carrier which carries the connector, the secondary carrier being provided with a predetermined amount of positional float with respect to the locating portion.

13. The structure as claimed in claim 12, wherein connector is provided with a predetermined amount of positional float with respect to the secondary carrier.

14. The structure as claimed in claim 5, wherein the connector is provided with a predetermined amount of positional float with respect to the connection carrier.

* * * * *